United States Patent
Esbensen et al.

(10) Patent No.: US 9,835,134 B2
(45) Date of Patent: Dec. 5, 2017

(54) METHOD AND COMPUTING MODULE FOR DETERMINING PITCH ANGLE ADJUSTMENT SIGNALS OF A WIND TURBINE BASED ON THE MAXIMUM ROTATIONAL SPEED

(75) Inventors: Thomas Esbensen, Herning (DK); Gustav Hoegh, Herning (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 1050 days.

(21) Appl. No.: 13/449,546

(22) Filed: Apr. 18, 2012

(65) Prior Publication Data
US 2012/0282091 A1 Nov. 8, 2012

(30) Foreign Application Priority Data
May 3, 2011 (EP) .................... 11164590

(51) Int. Cl.
F03D 7/04 (2006.01)
F03D 7/02 (2006.01)
F03D 11/00 (2006.01)

(52) U.S. Cl.
CPC .......... *F03D 7/0224* (2013.01); *F03D 7/043* (2013.01); *F05B 2270/32* (2013.01); *F05B 2270/335* (2013.01); *Y02E 10/721* (2013.01); *Y02E 10/723* (2013.01)

(58) Field of Classification Search
CPC ...... F03D 7/0224; F03D 7/0276; F03D 7/028; F03D 7/0296; F03D 7/043; F03D 7/044; F05B 2270/101; F05B 2270/32; F05B 2270/327; F05B 2270/335; F05B 2270/402

USPC ......... 416/25, 27, 30, 31, 36, 37, 43, 44, 61
See application file for complete search history.

(56) References Cited

U.S. PATENT DOCUMENTS

| | | | |
|---|---|---|---|
| 4,189,648 A * | 2/1980 | Harner | 290/44 |
| 4,193,005 A * | 3/1980 | Kos et al. | 290/44 |
| 2003/0151259 A1 | 8/2003 | Andresen | |
| 2004/0094964 A1 | 5/2004 | Christenson | |

(Continued)

FOREIGN PATENT DOCUMENTS

| | | |
|---|---|---|
| CN | 101592118 A | 12/2009 |
| CN | 101725471 A | 6/2010 |

(Continued)

*Primary Examiner* — Craig Kim
*Assistant Examiner* — Alexander White (57) ABSTRACT

A method and corresponding arrangement are provided for determining pitch angle adjustment signals for adjusting a pitch angle of a rotor blade connected to a rotation shaft of a wind turbine. The method includes obtaining a first maximal speed signal indicative of a first desired maximal rotational speed of the rotation shaft. The method also includes deriving a first pitch angle adjustment signal based on the first maximal speed signal. The method further includes obtaining a second maximal speed signal indicative of a second desired maximal rotational speed of the rotation shaft different from the first desired maximal rotational speed of the rotation shaft. Further, the method includes deriving a second pitch angle adjustment signal based on the second maximal speed signal. The second pitch angle adjustment signal is different from the first pitch angle adjustment signal.

12 Claims, 4 Drawing Sheets

(56) References Cited

U.S. PATENT DOCUMENTS

| | | |
|---|---|---|
| 2008/0136188 A1* | 6/2008 | Krueger .................... 290/44 |
| 2009/0218818 A1 | 9/2009 | Cardinal et al. |
| 2009/0250932 A1* | 10/2009 | Egedal ..................... 290/44 |
| 2010/0133618 A1 | 6/2010 | Herr |

FOREIGN PATENT DOCUMENTS

| | | |
|---|---|---|
| EP | 2264315 A2 | 12/2010 |
| WO | WO 9842980 A1 | 10/1998 |
| WO | WO 2006090215 A1 | 8/2006 |

\* cited by examiner

METHOD AND COMPUTING MODULE FOR DETERMINING PITCH ANGLE ADJUSTMENT SIGNALS OF A WIND TURBINE BASED ON THE MAXIMUM ROTATIONAL SPEED

CROSS REFERENCE TO RELATED APPLICATIONS

This application claims priority of European Patent Office application No. 11164590.9 EP filed May 3, 2011. All of the applications are incorporated by reference herein in their entirety.

FIELD OF INVENTION

The present invention relates to a method and a computing module for determining pitch angle adjustment signals for adjusting a pitch angle of a rotor blade connected to a rotation shaft of a wind turbine and further the present invention relates to a method and an arrangement for adjusting a pitch angle of a rotor blade or pitch angles of rotor blades of a wind turbine.

BACKGROUND OF INVENTION

A wind turbine may comprise a wind turbine tower, a nacelle mounted on top of the wind turbine tower, a rotation shaft rotatably supported within the nacelle, wherein the rotation shaft has one or more rotor blades connected to it. Impacting wind may transfer kinetic energy to the rotor blades which cause the rotation shaft to rotate. The rotation shaft may be mechanically connected to a generator which produces electric energy upon rotation of the rotation shaft. The nacelle may be mounted at the wind turbine tower such that the nacelle may rotate around a vertical axis to direct the rotor shaft and thus the blades in the momentary wind direction which may be denoted as yawing.

For adjusting a transfer of kinetic energy comprised in the wind to the rotation shaft via the rotor blades, the rotor blades may be rotated along a longitudinal axis of the rotor blades. Rotation of the rotor blade around its longitudinal axis (which may lie within a rotation plane being a plane perpendicular to the rotation axis or the rotation shaft) may also be referred to as adjusting a rotor blade pitch angle. Adjusting the rotor blade pitch angle may effect an efficiency or a degree of energy transfer from the wind to the rotor blade and thus to the wind turbine.

Depending on mechanical and/or electronic equipment or components of the wind turbine the wind turbine may be assigned a rated power output or nominal power output. During conditions, where the wind speed is not high enough for the wind turbine to reach the nominal power output the wind turbine may deliver less power output than the nominal power output to a utility grid.

It has been observed that adjusting a pitch angle of a rotor blade in particular in situations, where the wind turbine is operated below the rated power may be difficult. In particular, an optimal power production of a wind turbine at below rated power or below nominal power output may depend on the ability to apply an optimal pitch angle (the pitch angle is the angle between the blade cord line and the rotor plane of rotation which is perpendicular to the rotation shaft) and track the optimal rotor tip speed ratio (the ratio of rotor shaft speed to effective wind speed) at below rated rotational speed of the rotation shaft. Herein, the rated rotational speed of the rotation shaft may also be referred to as nominal rotational speed of the rotation shaft or the nominal speed or rated speed of the wind turbine.

There may be a need for a method and a computing module for determining a pitch angle adjustment signal for adjusting a pitch angle of a rotor blade connected to a rotation shaft of a wind turbine. Further there may be a need for a method for adjusting a pitch angle of a rotor blade of a wind turbine and for an arrangement for adjusting a pitch angle of a rotor blade of a wind turbine, wherein at least some of the above-mentioned problems are reduced.

SUMMARY OF INVENTION

This need may be met by the subject matter according to the independent claims Advantageous embodiments of the present invention are described by the dependent claims.

According to an embodiment of the present invention, a method for determining pitch angle adjustment signals for adjusting a pitch angle (an angular position of the rotor blade, wherein a longitudinal axis of the rotor blade represents a rotor blade rotation axis for adjusting the angular position) of a rotor blade (a mechanical structure comprising an aerofoil for capturing wind or transferring mechanical energy comprised in the wind to kinetic energy or rotational energy of the rotor blade) connected to a rotation shaft (in particular having a horizontally oriented rotation axis, wherein a plane perpendicular to the rotation axis may define a plane of rotation or rotation plane) of a wind turbine is provided. Thereby, the method comprises obtaining (such as via a terminal or an, in particular electrical, input line) a first maximal speed signal or speed reference (in particular an electrical signal, an optical signal or the like) indicative of a first desired maximal rotational speed (defining a rotational speed which should not be exceeded during operation of the wind turbine in a particular operation mode, such as a first operation mode) of the rotation shaft; and deriving (in particular comprising performing a computation, looking up a look-up table, reading reference or calibration values, evaluating a mathematical function, numerically deriving a value from one or more input values and/or the like) a first pitch angle adjustment signal (in particular an electrical signal, an optical signal or the like) based on the first maximal speed signal. Further, the method comprises obtaining (in particular via a terminal or an, in particular electrical, input line, in particular the same input line via which the first maximal speed signal has been obtained) a second maximal speed signal (in particular an electrical signal or an optical signal) indicative of a second desired maximal rotational speed of the rotation shaft different from, in particular smaller than, the first desired maximal rotational speed of the rotation shaft; and deriving (in particular comprising performing a computation, looking up a look-up table, reading one or more values, such as calibration values or reference values from a storage, such as a database, numerically and/or analytically solving an equation or the like) a second pitch angle adjustment signal (in particular an electrical signal or an optical signal) based on the second maximal speed signal, wherein the second pitch angle adjustment signal is different from the first pitch angle adjustment signal.

The first/second pitch angle adjustment signal may be any (electrical, mechanical and/or optical) signal on which the adjusted first/second pitch angle depends or based from which the adjusted first/second pitch angle can be derived. Different units (such as volt, meter, degree) may be applied to define the first/second pitch angle adjustment signal. In particular, the first/second pitch angle adjustment signal may be derived in, and supplied from, the wind turbine controller to the pitch system.

Also, the first/second pitch angle adjustment signal may refer to internal control signals in the pitch system, which may be supplied to the pitch actuator, wherein the pitch system may consists of actuators and in particular also of an internal controller to translate the received pitch angle signals to an actual pitch position. A hydraulic pitch system (or electrical pitch system) may move the pitch actuator (or electric motor connected to a gear) in accordance to the first/second pitch angle adjustment signal to change the blade pitch angle(s).

Internally in either the hydraulic pitch system or the electrical pitch system several units may be used, such as degree, meter (length of piston), and/or volt, to define the first/second pitch angle adjustment signal.

In particular, a signal for adjusting a pitch angle of a rotor blade may be derived based on or taking into account a maximal speed signal of the rotation shaft. In particular a desired maximal rotation speed may be required to be set to different values according to particular regulations, needs, operation modes, or the like.

In particular, taking into account the maximal speed signal of the rotation shaft for deriving the pitch angle adjustment signal (based on which the pitch angle will be adjusted) may improve, in particular increase, a power output of the wind turbine, and may reduce structural loads and/or acoustic noise. In particular, in order to capture the largest possible amount of energy from the wind, it may be important that the pitch angle reference and the power (or torque) reference are adapted to the current operational conditions. In particular, the inventors found that the optimal pitch setting may be strongly impacted by the maximum rotational speed for the particular operation mode. Thereby, exploiting this finding when setting the pitch reference to ensure optimal turbine operation may improve the power production.

There may be a number of reasons for operating the wind turbine in different operation modes which differ with respect to the maximum rotational speed. In particular, during a first operational mode, the wind turbine may be operated at the original design speed (which may for example be defined based on an optimum of operating the wind turbine according to its mechanical and/or electronic properties). During a second operational mode the wind turbine may be assigned a second desired maximum rotational speed which may be slower or smaller than the original design speed or a first desired maximum rotational speed due to requirements of reducing acoustic noise emissions, wakes, and/or structural loads.

The inventors found that, if the pitch reference is not compensated, when reducing the maximum rotational speed, then the overall turbine efficiency may be significantly reduced and structural loading of the turbine may increase. The efficiency of rotor is affected when the wind turbine cannot maintain the optimal tip-speed ratio (the ratio between the rotational speed of the tip of a blade and the actual velocity of the wind) for reduced speed operation.

Thus, determining the pitch angle adjustment signal (i.e. the first pitch angle adjustment signal as well as the second pitch angle adjustment signal) taking into account the maximal rotational speed in the particular operation mode (i.e. the first desired maximum rotational speed and the second desired maximal rotational speed, respectively) may improve the efficiency of the wind turbine, in particular during power production below the rated power output due to relatively low wind speed.

In the following, the first pitch angle may also be referred to as the optimal pitch angle to maximize power production, when the maximal rotational speed of the rotation shaft is set to the first desired maximal rotational speed of the rotation shaft. Similarly, the second pitch angle may also be referred to as the optimal pitch angle to maximize the power production, when the maximal rotational speed of the rotation shaft is set to the second desired maximal rotational speed of the rotation shaft. Further, in particular, the first maximal speed signal as well as the second maximal speed signal may be additionally a function of power, torque, wind speed, rotational speed, or any other operational parameters that define the current working point or operational mode of the wind turbine.

The maximal rotational speed of the rotation shaft may also be known as or referred to as the speed reference of the wind turbine controller. The importance of correcting the pitch reference may increase with the level of reduction of the maximal rotational speed compared to the design/nominal rotational speed of the wind turbine. Only recently the problem may have become a serious problem, because of the increased focus on curtailment in order to reduce acoustic noise emissions, structural loads etc. In particular, embodiments of the present invention enable wind turbine operation in an improved way at reduced rotational speeds.

In particular the first pitch angle signal and the second pitch angle signal may refer to a plurality of pitch angle signal instances of points (forming a pitch angle signal curve) that may depend on (or vary depending on) a parameter such as power output, generator torque, wind speed, rotational speed, etc. The same holds for the first pitch angle and the second pitch angle which may also refer to corresponding curves.

When writing pitch angle it may refer to a single pitch angle point associated with the mentioned pitch angle curve or to the associated pitch angle curve comprising a plurality of pitch angle points.

According to an embodiment, the method further comprises obtaining a power signal or torque signal (such as electrical power output, torque at the generator or the like) indicative of a power output or torque of the wind turbine or indicative of a wind speed (in particular an electrical power output of the wind turbine), wherein the deriving the first pitch angle adjustment signal is further based on the power signal (such that the power signal is taken into account to derive the first pitch angle adjustment signal), wherein the deriving the second pitch angle adjustment signal is also further based on the power signal.

In particular, the first pitch angle adjustment signal may change when the power signal changes. Further, the second pitch angle adjustment signal may change when the power signal changes. Taking also the power output of the wind turbine into account for deriving the pitch angle adjustment signals (and eventually adjusting the pitch angles) may further improve the efficiency of the wind turbine. In other embodiments further or additional parameters defining the running condition or operational mode of the wind turbine may be taken into account, to derive the pitch angle adjustment signals, such as wind speed, temperature, rotor swept area, air density, rotor effective wind speed, and the like.

The first/second pitch angle adjustment signal may be set as function of measured wind speed, estimated wind speed, or rotational speed instead of power/torque.

According to an embodiment of the invention, the power signal indicates that the power output of the wind turbine is smaller than a nominal power output of the wind turbine. In particular, the nominal power output may be defined to represent the maximal power output of the turbine for continuous operation, wherein the mechanical and/or electronic load on components of the wind turbine are in an acceptable range. Further, the nominal power output of the wind turbine may be defined by a park controller in order to appropriately operate a wind park comprising a plurality of wind turbines. The nominal power output may define a particular active power output and a particular reactive power output. In particular, during an operational condition of the wind turbine, while the wind turbine produces power output below the nominal power output, the rotor shaft may be rotated below the desired maximal rotational speed. In particular, when operating the wind turbine below nominal power output, power production may be very sensitive to the adjusted rotor blade pitch angle.

According to an embodiment of the present invention, a method for adjusting a pitch angle of a rotor blade of a wind turbine is provided, wherein the method comprises determining a first pitch angle adjustment signal and a second pitch angle adjustment signal for adjusting a pitch angle of a rotor blade connected to a rotation shaft of a wind turbine according to an embodiment of a method as described above; adjusting (in particular comprising supplying the first pitch angle adjustment signal to an adjusting arrangement and/or to an actuator and rotating or turning or swivelling the rotor blade around a longitudinal axis of the rotor blade to set a particular angular position) the pitch angle (which may be defined as an angle between a cord line of the rotor blade and a plane of rotation which is perpendicular to the rotational axis of the rotation shaft) of the rotor blade to a first pitch angle based on the first pitch angle adjustment signal; and then adjusting the pitch angle of the rotor blade to a second pitch angle based on the second pitch angle adjustment signal.

In particular, the pitch angle adjustment signals (e.g. given in units of volt, degree, meter) may be proportional to the respective adjusted pitch angles (e.g. measured in units of degree). In particular, the pitch angle adjustment signals may be electrical signals which may be supplied to at least one actuator which is arranged and adapted to rotate or turn the rotor blade around its longitudinal axis.

In particular, the rotor blade may comprise an upstream edge or a leading edge and a downstream edge or a trailing edge, wherein the wind may hit or impact the rotor blade first at the leading edge and may then flow along a front face of the rotor blade and a back face of the rotor blade (which may have in particular a longer path or a greater area than the front face) and may then reach the trailing edge of the rotor blade. Increasing the pitch angle of the rotor blade may involve turning the leading edge towards the wind and turning the trailing edge away from the wind. In particular, a pitch angle of 0° may be achieved by placing the leading edge as well as the trailing edge (both being comprised in a cord line of the rotor blade) within the plane of rotation which is perpendicular to the rotation shaft.

In particular, the rotation shaft may at least approximately be oriented along the wind direction. Adjusting the pitch angles to the first pitch angle and the second pitch angle, respectively, while the maximal rotational speed is set to the first desired maximal rotational speed and the second desired maximal rotational speed, respectively, may improve the efficiency of the wind turbine regarding power output.

According to an embodiment of the present invention, the first pitch angle and/or the second pitch angle increases or decreases or is at least approximately constant for increasing power output of the wind turbine and/or for increasing wind speed. Typically, the first pitch angle and/or the second pitch angle may increase for increasing power output of the wind turbine, to reduce noise and/or loads. Further, the efficiency of the wind turbine regarding its power output may be improved.

According to an embodiment of the present invention, the second desired maximal rotational speed is smaller than the first desired maximal rotational speed, wherein the second pitch angle is greater than the first pitch angle. Setting the second pitch angle greater than the first pitch angle may improve power production, while ensuring that the second desired maximal rotational speed is not exceeded. Thereby, in particular, also control regarding noise emissions and/or load reduction may be met, while improving power production.

According to an embodiment of the present invention, the second pitch angle is, in particular for a given power output and/or wind speed, all the more greater than the first pitch angle the smaller the second desired maximal rotational speed is compared to the first desired maximal rotational speed. In particular, a difference or a ratio of the second pitch angle and the first pitch angle may be the higher the greater a difference or a ratio between the first desired maximal rotational speed and the second desired maximal rotational speed is. Thereby, the efficiency of the wind turbine may further be improved.

According to an embodiment of the present invention, the second pitch angle (in particular the second pitch angle curve) increases more strongly (in particular has a steeper slope when plotted in dependence of the power output) for increasing power output and/or increasing wind speed than the first pitch angle (in particular the first pitch angle curve).

In particular, a slope or a magnitude of a slope may increase, when the difference or the ratio between the first desired maximal rotational speed and the second desired maximal rotational speed increases. Thereby, the power output of the wind turbine may further be increased.

According to an embodiment of the present invention, the second desired maximal rotational speed is between 0% and below 100%, in particular between 10% and 95%, further in particular between 50% and 90% of the first desired maximal rotational speed. Thereby in particular regulations regarding noise emission may be satisfied.

According to an embodiment of the present invention, the first pitch angle and/or the second pitch angle is (at least approximately, in particular in a range of +/−3° around a center position) constant for power output below a threshold. In particular, the threshold may be lower than the nominal power output. In particular, the threshold may be related to the situation, when the rotational speed of the rotation shaft reaches the desired maximal rotational speed. In particular, keeping the first pitch angle and/or the second pitch angle constant for power output below the threshold may simplify the method for adjusting the pitch angle.

In particular, below a threshold, the first pitch angle and/or the second pitch angle may not be constant but may be equal to the nominal pitch trajectory conventionally used which may vary for varying power output.

According to an embodiment of the present invention, the first pitch angle is (at least approximately) constant for a rotational speed below the first desired rotational speed and/or the second pitch angle is (at least approximately) constant for a rotational speed below the second desired rotational speed.

In particular, the first pitch angle is (at least approximately) equal to a nominal pitch angle curve for a rotational speed below the first desired rotational speed and/or the second pitch angle is (at least approximately) equal to the nominal pitch angle curve for a rotational speed below the second desired rotational speed. Thereby, the nominal pitch angle curve (also referred to as "nominal pitch trajectory") may or may not be constant for increasing power output. In particular, the first pitch angle and the second pitch angles may be equal below the second desired rotational speed.

Thereby, the method may be simplified, while maintaining optimal power output. According to other embodiments even below the respective desired rotational speed the pitch angle varies for varying wind conditions or other varying parameters defining the working point of the wind turbine.

According to an embodiment of the present invention, the first pitch angle is (at least approximately) equal to the second pitch angle for a rotational speed below the second desired rotational speed and/or the second pitch angle is (at least approximately) equal to the first pitch angle below the second rotational speed. Thereby, the method may be simplified, while maintaining optimal power output.

According to an embodiment, when the second desired rotational speed is desired as the rotational speed of the rotation shaft, the adjusting the pitch angle to the second pitch angle results in a higher power output of the wind turbine than adjusting the pitch angle to the first pitch angle. Thereby, the power output of the wind turbine may be increased.

It should be understood that features (individually or in any combination) disclosed, described, explained, and/or applied for a method for determining pitch angle adjustment signals or to a method for adjusting a pitch angle may also be applied, used for or provided (individually or in any combination) to a computing module for determining pitch angle adjustment signals and to an arrangement for adjusting a pitch angle of a rotor blade of a wind turbine according to an embodiment of the present invention and vice versa.

According to an embodiment of the present invention, a computing module for determining pitch angle adjustment signals for adjusting a pitch angle of a rotor blade connected to a rotation shaft of a wind turbine is provided, wherein the computing module is adapted to obtain (in particular comprising supplying an optical or electrical signal) a first maximal speed signal (such as an optical signal or an electrical signal) indicative of a first desired maximal rotational speed of the rotation shaft (to which the rotor blade is connected); to derive a first pitch angle adjustment signal (in particular an optical signal or an electrical signal) based on the first maximal speed signal; to obtain (in particular via an input terminal, in particular an electrical input terminal) a second maximal speed signal (in particular an optical signal or an electrical signal) indicative of a second desired maximal rotational speed of the rotation shaft different from, in particular smaller than, the first desired maximal rotational speed of the rotation shaft; and to derive (in particular involving executing a program on a processor, performing a numerical and/or analytical computation, reading one or more reference or calibration data from a data storage) a second pitch angle adjustment signal (in particular an optical signal or an electrical signal) based on the second maximal speed signal, wherein the second pitch angle adjustment signal is different from the first pitch angle adjustment signal.

The computing module may be implemented in hardware and/or in software. The computing module may be an application specific integrated circuit (ASIC) and/or may be represented as machine-readable software code. The computing module may comprise one or more input terminals and one or more output terminals. In particular, the computing module may be comprised in a wind turbine controller. The wind turbine controller may control the operation of the wind turbine, such as controlling the rotational speed of the rotation shaft by adjusting rotor blade pitch angles, adjusting power output (or torque) of a converter connected to the generator, etc. Thereby, in particular, the computing module may be adapted to perform a method for determining pitch angle adjustment signals according to an embodiment as explained above.

According to an embodiment, an arrangement for adjusting a pitch angle of a rotor blade of a wind turbine is provided, wherein the arrangement comprises a computing module for determining a first pitch angle adjustment signal and a second pitch angle adjustment signal for adjusting a pitch angle of a rotor blade connected to a rotation shaft of a wind turbine according to an embodiment as explained above; and an adjustment arrangement which is adapted to adjust the pitch angle of the rotor blade to a first pitch angle based on the first pitch angle adjustment signal and afterwards to adjust the pitch angle of the rotor blade to a second pitch angle based on the second pitch angle adjustment signal.

The adjusting arrangement may in particular comprise an actuator, such as an electric motor or hydraulic system, which is adapted to rotate the rotor blade around its longitudinal axis (which is in particular perpendicular to the rotation shaft).

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention are now described with reference to the accompanying drawings. The invention is not limited to the illustrated or described embodiments. In the drawings like reference numerals may denote like elements in structure and/or function. Thereby, reference numerals of similar elements may differ only in the first digit.

DETAILED DESCRIPTION OF INVENTION

The illustration in the drawings is in schematic form. It is noted that in different figures, similar or identical elements are provided with the same reference signs or with reference signs, which are different from the corresponding reference signs only within the first digit.

Figure 1:
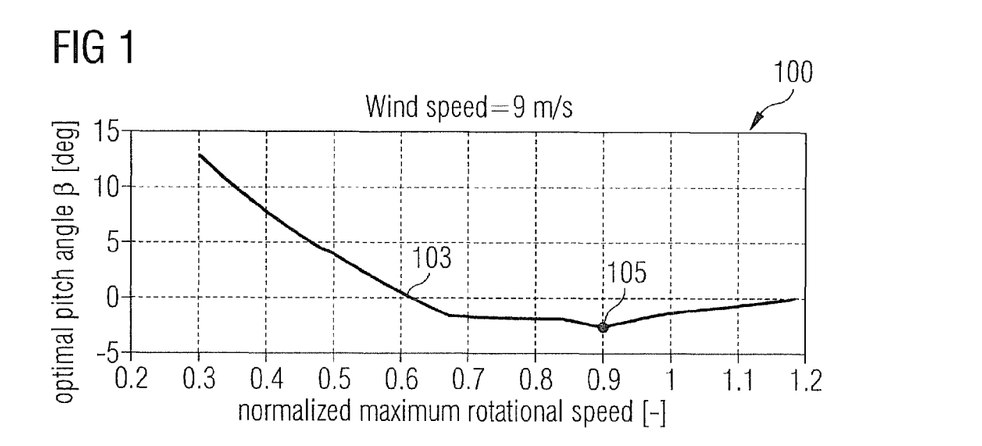
FIG. 1 and FIG. 2 illustrate graphs considered during a method according to an embodiment of the present invention.

FIG. 1 illustrates a graph 100 showing on an ordinate the optimal pitch angle β and on an abscissa a normalized maximal rotational speed (as a ratio with respect to a design maximum rotational speed), wherein a curve 103 indicates the optimal pitch angle β in dependence of the normalized maximum rotational speed.

A point 105 at coordinates (1, −2°) may correspond to a situation, where the wind turbine is operated at the design rotational speed of the rotation shaft. According to regulations or a demand by a wind farm controller the maximum rotational speed may be set to be above or to be below the maximum design rotational speed.

The graph 100 illustrated in FIG. 1 relates to an external condition, wherein the wind speed amounts to 9 m/s. As can be taken from the graph 100 in FIG. 1 the optimal pitch angle β varies in a range between around 13° and −2°. In particular, at a normalized maximum rotational speed of 0.3 the optimal pitch angle amounts to around 13° and then decreases up to the normalized maximum rotational speed of 0.9 to a value of approximately −2°. From the normalized maximum rotational speed of 0.9 the optimal pitch angle β (curve 103) increases from around −2° to about 0° at the normalized maximum rotational speed of 1.2. In particular, at a wind speed of 9 m/s the wind turbine may output electric power below the rated electric power or the nominal power output.

Figure 2:
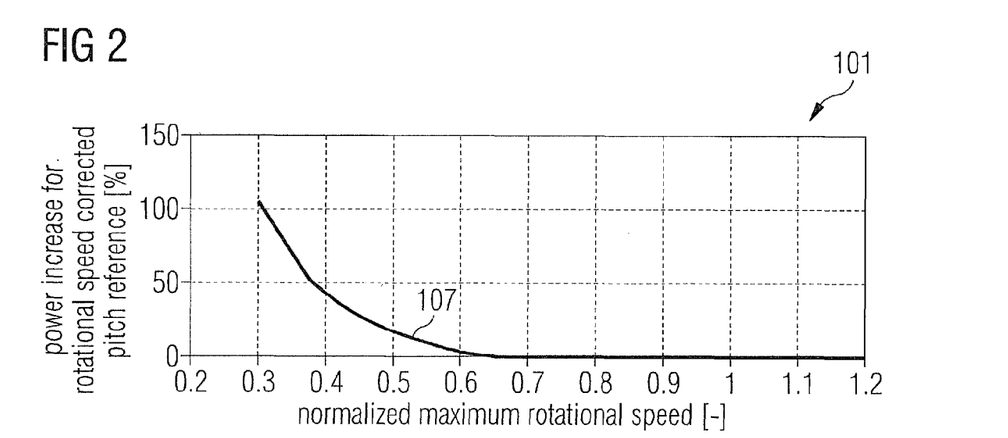

The graph 101 illustrated in FIG. 2 shows on its abscissa the normalized maximum rotational speed and on its ordinate the power increase for rotational speed corrected pitch reference, i.e. the increase of power output, when the pitch angle is set according to curve 103 in graph 100 illustrated in FIG. 1. In particular, the curve 107 in the graph 101 of FIG. 2 illustrates the power increase in percent relative to the case where the pitch angle is set to −2.0° corresponding to the value of the pitch angle at the maximum design rotational speed (point 105 in graph 100 of FIG. 1). As can be taken from the graph 101 of FIG. 2, the power output increase amounts to about 100% at the normalized maximum rotational speed of 0.3 and then decreases for increasing normalized maximum rotational speed to about 0% at the normalized maximum rotational speed of around 0.65. Thus, setting the pitch angle according to the curve 103 illustrated in graph 100 of FIG. 1 will in particular improve the power output in the region below 0.65 (in particular between 0.3 and 0.65) of the normalized maximum rotational speed, in particular, when lowering the maximum rotational speed of the rotation shaft below the design rotational speed (corresponding to the abscissa value 1.0 in the graphs 100 and 101).

Figure 3:
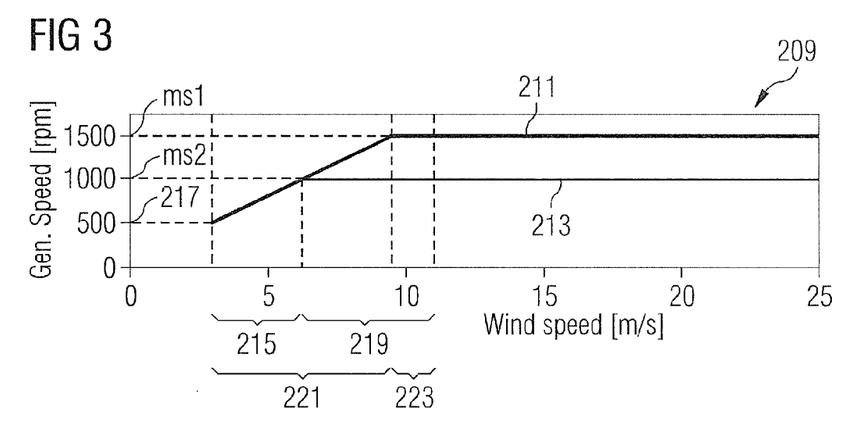
FIG. 3 and FIG. 4 illustrate graphs to explain operational modes of a wind turbine considered in a method according to an embodiment of the present invention.
Figure 4:
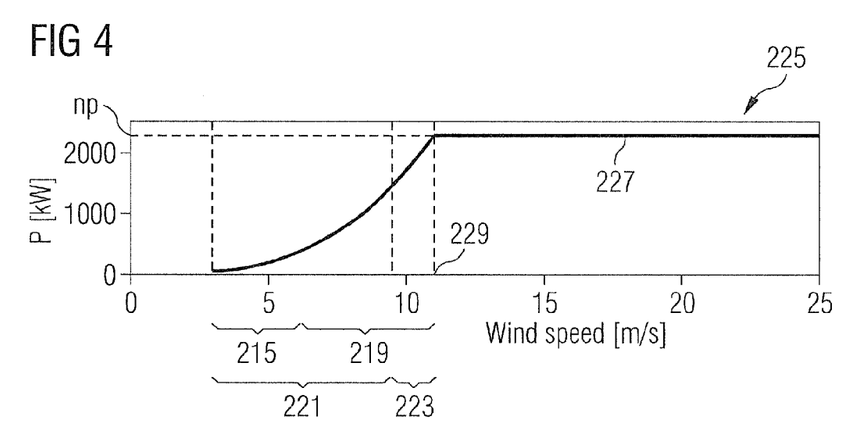

In particular, FIG. 3 and FIG. 4 show what may be called the "nominal operating trajectory of rotational speed and electrical power output", respectively. In average the rotational speed and power may be as shown in FIG. 3 and FIG. 4 as function of the wind speed.

FIG. 3 illustrates a graph 209 illustrating on its abscissa the wind speed in m/s and on its ordinate the generator speed or rotational speed of the rotation shaft in rpm. In particular, a curve 211 illustrates the dependency of the rotational speed on the wind speed when the maximal rotational speed is set to a first desired maximal rotational speed ms1 which corresponds to approximately 1500 rpm.

Another curve 213 illustrates the dependency of the rotational speed of the rotation shaft when the maximal rotational speed is set to a second desired maximal rotational speed ms2 which corresponds approximately to 1100 rpm. According to an embodiment, the maximum rotational speed ms1 may be considered as a first desired maximal rotational speed and ms2 may be considered as a second desired maximal rotational speed. According to an embodiment, the first desired maximal rotational speed may be the design rotational maximal speed. When the desired maximal rotational speed is set to the value ms2 the rotational speed increases in a region 215 from around 500 rpm (reference sign 217) to the value ms2 and the rotational speed remains constant in a region 219 and beyond the region 219. When the desired maximal rotational speed is set to the value ms1 the rotational speed increases in a region 221 from around 500 rpm (reference sign 217) to the value ms1 and the rotational speed remains constant in a region 223 and beyond the region 223.

In particular, the desired maximum rotational speed ms2 is reached for lower wind speed than the desired maximum rotational speed ms1.

When the desired maximal rotational speed is set to the value ms1 the rotational speed increases from the value 500 rpm (reference sign 217) in a region (wind speed region) 221 in a linear fashion to the first desired maximal rotational speed ms1. In a region 223 and beyond the region 223 the rotational speed is maintained at the value ms1. According to embodiments of the present invention, adjusting the pitch angle of a rotor blade is performed in the regions 215, 219 (or only in region 219), when the desired maximal rotational speed is set to the second desired maximal speed ms2. Further, according to an embodiment, the pitch angle is adjusted in the regions 221, 223 (or only in region 223), when the first desired maximal rotational speed ms1 is set as the desired maximal rotational speed.

Plot 225 in FIG. 4 illustrates on its abscissa the wind speed in m/s and on its abscissa the power output P of the wind turbine in kW. Thereby, a curve 227 depicts the power output P of the wind turbine in dependence of the wind speed. As can be seen in the union of the regions 215 and 219 or the union of regions 221 and 223, respectively, the power output increases from a value slightly above 0 kW to a value at about 2200 kW. Beyond the wind speed of around 12 m/s (reference sign 229) the power output remains at the nominal power output np. Thus the regions 215, 219 or 221, 223, respectively, correspond to running conditions of the wind turbine, where the wind turbine is operated below the nominal power np or rated power output of the wind turbine.

In particular when using the reduced maximal speed ms2 it may be necessary to reduce the power as well, if the same generator torque should be maintained (i.e. if the nominal generator torque should not be increased). Note that power=speed*torque, so when the maximal speed is reduced it may be necessary to lower the power as well in order not to overload mechanical components, e.g. the drive train. Similarly, this may also be necessary in order not to overload the power electronics or electrical components, e.g. caused by too high currents.

In particular, the adjustment of the optimal pitch angle according to curve 103 in plot 100 of FIG. 1 is especially performed in regions 215, 219 or 221 and 223, respectively. In particular, the adjustment of the optimal pitch angle according to curve 103 in plot 100 of FIG. 1 may be applied in situations, where the wind turbine is operated below the rated or nominal power, but where the wind speed is large enough such that the rotational speed of the rotation shaft may exceed the desired maximal rotational speed.

According to an embodiment, the pitch angle reference may be based on the maximum rotational speed. The power captured by a wind turbine may be expressed as:

$$P = 0.5 \cdot \rho \cdot A \cdot C_p \cdot v^3$$

where P is the power captured by the wind turbine [W], $\rho$ is the air density [kg/m$^3$], A is the rotor swept area [m$^2$], $C_p$ is the power coefficient of the turbine, v is the rotor effective wind speed [m/s].

Thereby, the power coefficient $C_p$ may be a function of the pitch angle $\beta$ and the tip speed ratio (the ratio between the blade tip speed and the wind speed). This means that the turbine efficiency may be maximized for a certain pitch angle $\beta$ and for a given tip speed ratio.

If the pitch reference is not compensated according to the curve 103 depicted in graph 100 of FIG. 1, a sub-optimal operation point may be obtained. However, if the pitch angle $\beta$ is set based on the current maximum rotational speed, i.e. the first desired maximum speed ms1 or the second desired maximal rotational speed ms2, respectively, it may be possible to maximize power production P of the wind turbine.

Typically, the optimal pitch angle may be fixed for operation below the rated rotational speed (also known as the nominal speed). The curve 103 illustrated in plot 100 of FIG. 1 illustrates in which way the optimal pitch angle $\beta$ depends on the maximal rotational speed. From plot 101 of FIG. 2 it may be concluded that a significant power gain can be achieved by setting the pitch angle $\beta$ according to the curve 103 illustrated in the plot 100 of FIG. 1.

The optimal pitch angle (as illustrated with curve 103 in plot 100 of FIG. 1) may change with different wind speeds. Typically, the wind speed may be mapped into a power value by using a power curve (such as a curve 227 as shown in plot 225 of FIG. 4) and the pitch reference may then be set using the current power or torque reference. The power curve 227 in plot 225 of FIG. 4 may specify the expected power production as a function of the wind speed. Alternatively, the pitch reference for below rated speed operation may be set as a function of the rotational speed or the wind speed. In particular, the rotational speed may also be expressed as a rotational frequency of the rotation shaft.

Figure 5:
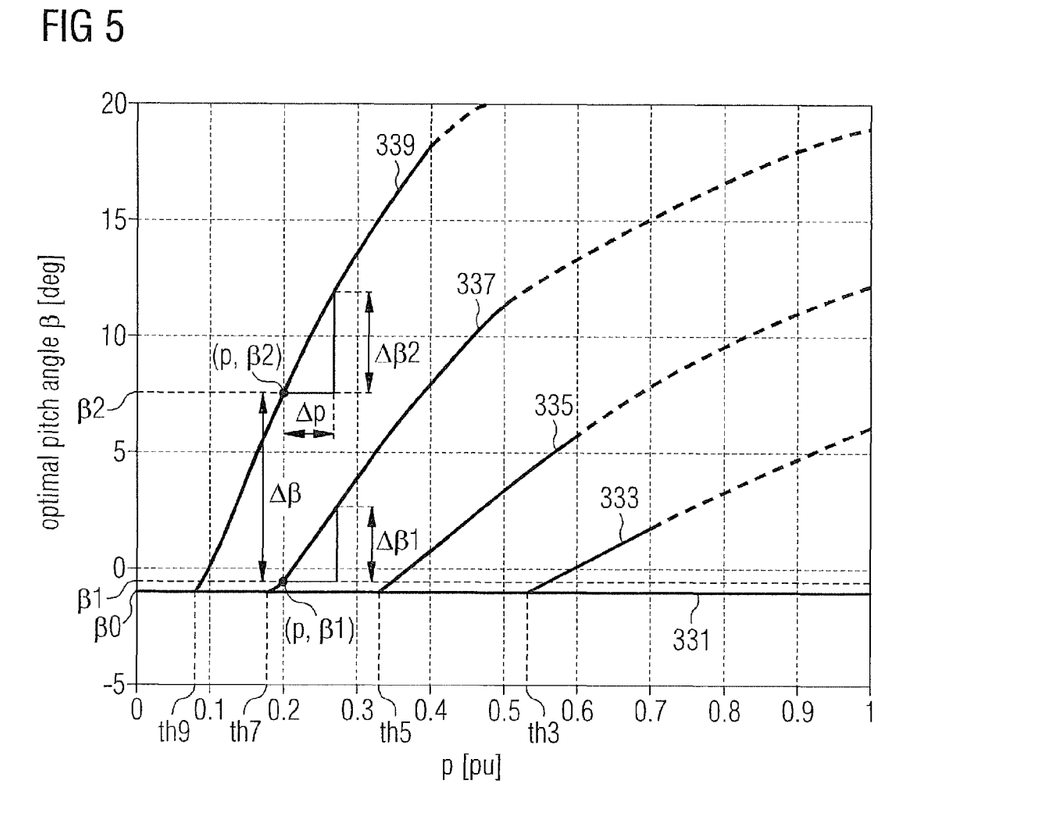
FIG. 5 illustrates a graph from which pitch angles or signals may be derived and which may be considered in a method according to an embodiment of the present invention.

FIG. 5 illustrates a plot showing on its abscissa the power p per unit (i.e. in units as a ratio of the nominal power output) and showing on its ordinate the optimal pitch reference or optimal pitch angle $\beta$ in degrees. A curve 331 illustrates the dependency of the pitch angle $\beta$, when 100% of the design speed is set as the desired maximal rotational speed. As can be seen, the optimal pitch angle $\beta$ according to curve 331 is constant (value $\beta 0$) for increasing power output in a range of 0 to 1, i.e. 0 kW to the nominal power output, such as for example above 2000 kW. Alternatively, the optimal pitch angle $\beta$ may also be non-constant for increasing power output depending on the aerodynamic properties of the rotor. In particular, the pitch angle may have to be changed (e.g. increased) typically in the part of region 219 in FIG. 3 and FIG. 4 where the rotational speed is constant.

The curve 333 illustrates the case, when the desired maximal rotational speed is set to 70% of the design speed, wherein the design speed may in particular be the nominal maximal rotational speed as dictated by mechanical and/or electronic properties of the wind turbine taking into account where related configurations and/or load-related requirements or considerations. As can be seen the optimal pitch angle $\beta$ according to curve 333 increases approximately linearly for power output above approximately 0.55 (threshold th3) up to a power output of 0.7. The end point of the solid portion of curve 333 may correspond to a nominal torque. The pitch angle may be adjusted according to the dashed portions of curves 333, 335, 337, 339, which may correspond to torque larger than a nominal torque, if the wind turbine is intended to (temporarily) be operated above rated or nominal torque.

Lowering the maximum rotational speed often may result in an equal (or proportional) reduction of the maximum power output in order to avoid increasing the torque on the generator and particular the gearbox (if any). Also the electric currents in the power electronic (converter, generator) would increase if the torque increased. Therefore, the turbine would often have reached a region beyond regions 219, 223 in FIG. 3 and FIG. 4, where one may control the speed by pitching (apply a non-optimal pitch angle to reduce the cp value, being the power coefficient of the rotor).

The curve 335 in FIG. 5 illustrates the case, when the desired maximal rotational speed is set at 60% of the design speed. As can be seen from FIG. 5, the optimal pitch angle according to the curve 335 is greater than the pitch angle for the curve 333 and greater than the pitch angle according to the curve 331. In particular, the pitch angle according to the situation, when the desired maximal rotational speed is set to 60% of the design speed (curve 335) increases approximately linearly for a power larger than about 0.33 (threshold th5) to a power of about 0.6 per unit.

Curve 337 illustrates the optimal pitch angle $\beta$ in the case where the desired maximal rotational speed is set to a first desired maximal rotational speed, in the illustrated example 50% of the design speed. Further, curve 339 illustrates the optimal pitch angle $\beta$ in the case, when the desired maximal rotational speed is set at a second desired maximal rotational speed, in the illustrated example 40% of the design speed.

For illustration and explanation the pitch angle $\beta$ for the two cases will be compared at a normalized power output p of 0.2 for illustration. When the desired maximal rotational speed is set at the first desired maximal rotational speed (such as ms1 as illustrated in plot 209 of FIG. 3) the optimal pitch angle $\beta$ amounts to $\beta 1$. In contrast, when the second desired maximal rotational speed is set as the desired maximal rotational speed of the rotation shaft (i.e. ms2 as indicated in plot 209 in FIG. 3) the optimal pitch angle $\beta$ amounts to $\beta 2$ which is by an amount $\Delta\beta$ greater than the first pitch angle $\beta 1$. This difference amounts to about 8° in the illustrated example. Further, the slopes of the curves 337 and 339 are different. In particular, the slope of the curve 337 at the point (p, β1) amounts to Δβ1/Δp which is smaller than the steepness of the curve 339 which amounts at the same abscissa value p to Δβ2/Δp.

According to an embodiment a method for adjusting a blade pitch angle may comprise the following steps:
1. Determining the power reference (torque reference, wind speed, or rotational speed)
2. Determining the current maximum speed (i.e. defining the desired maximal rotational speed) which may be a reduction of the design speed (or nominal speed).
3. Adjusting the pitch reference accordingly (i.e. adjusting the pitch angle). This may be done by computing the optimal pitch reference or pitch angle or pitch adjustment signal as a function of the current maximal speed (the desired maximal speed) based on equations or look-up tables capturing the relations illustrated in FIGS. 1, 2 and/or 3. According to an embodiment the pitch angle is optimized regarding structural loads, acoustic noise emissions while at the same time optimizing energy efficiency.

Figure 6:
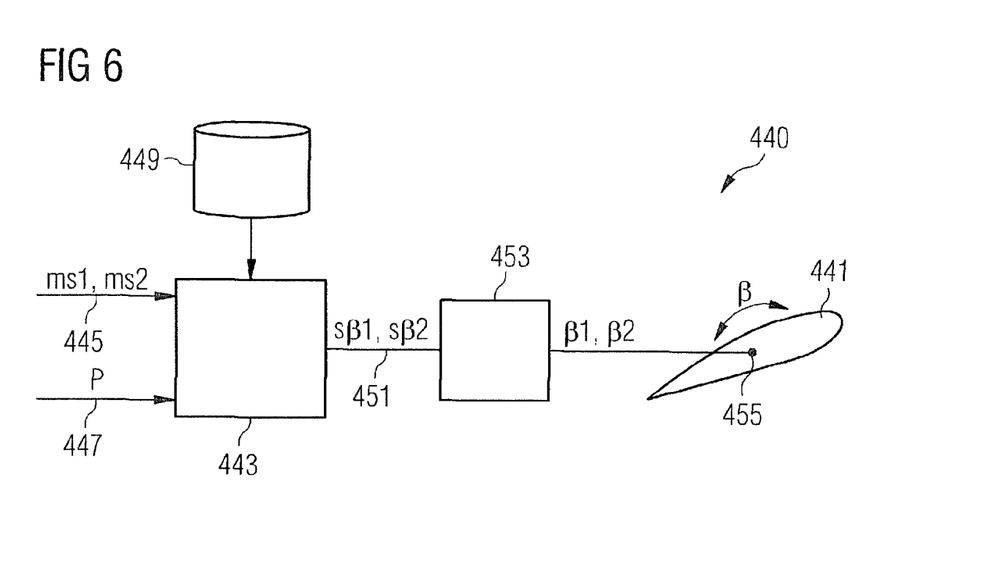
FIG. 6 illustrates schematically an arrangement for adjusting a pitch angle according to an embodiment of the present invention comprising a computing module for determining pitch angle adjustment signals according to an embodiment of the present invention.

FIG. 6 schematically illustrates an arrangement 440 for adjusting a pitch angle of a rotor blade 441 according to an embodiment of the present invention comprising a computing module 443 according to an embodiment of the present invention. Via an input line 445 the computing module 443 receives a first maximal speed signal ms1 or a second maximal speed signal ms2 which indicate a first desired maximal rotational speed ms1 and a second desired maximal rotational speed ms2, respectively. Further, the computing module 443 receives via an input line 447 a signal indicative of a power output p (or P) of the wind turbine or torque or wind speed. Thereby p denotes a normalized power output (with respect to a nominal power output) and P denotes the absolute power output.

Further, the computing module 443 has access to a storage device 449 which may store data or coefficients for a function representing at least one curve of the plots illustrated in FIGS. 1, 2 and/or 3. In particular, the curve 103 of plot 100 illustrated in FIG. 1 and the curves 331, 333, 335, 337, 339 illustrated in FIG. 5 may be represented in some data structure stored in the storage device 449 and being accessible by the computing module 443. In particular, the storage device 449 may provide calibration data or reference data to the computing module 443.

Based on the maximal speed signal supplied via the line 445 and the power signal supplied by the line 447 the computing module 443 determines a pitch angle adjustment signal (based on a first maximal speed signal or a second maximal speed signal) and supplies the respective pitch angle adjustment signal s131, s132, respectively, via a signal line 451 to an actuator 453. The actuator 453, e.g. an electric motor or hydraulic system, is mechanically connected to the rotor blade 441 and mechanically rotates the rotor blade around its longitudinal axis 455 to adjust the pitch angle β according to derived pitch angle adjustment signal.

Figure 7:
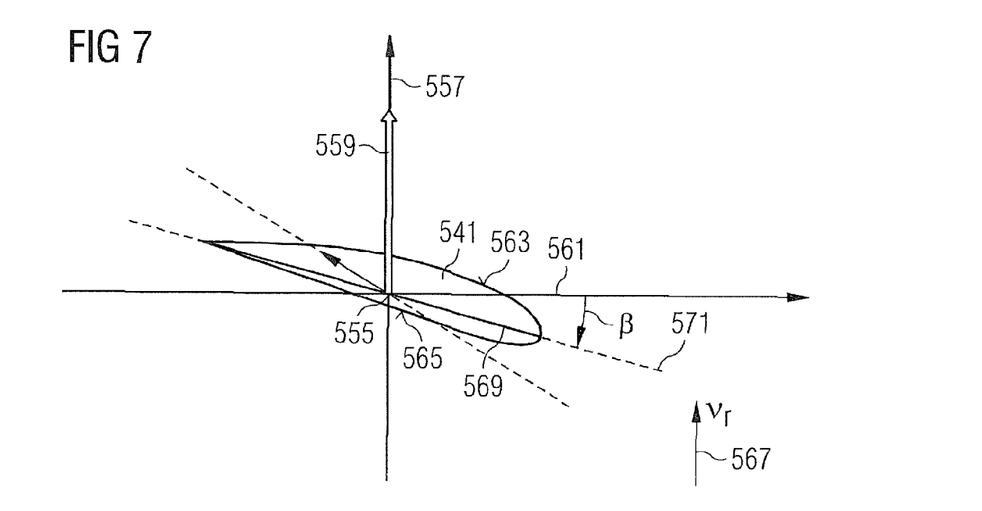
FIG. 7 schematically illustrates a cross-sectional view of a rotor blade for defining in particular a pitch angle of the rotor blade and other properties of the rotor blade related to methods according to embodiments of the present invention.

FIG. 7 illustrates schematically a cross-sectional view (airfoil) of a rotor blade 541 as viewed along a longitudinal axis 555 of the rotor blade. The vertical axis 557 represents the rotor axis of the rotor 559 and the horizontal axis 561 lies within the plane of rotation in which the rotor blade 541 rotates.

The rotor blade 541 comprises an upper surface 563 and a lower surface 565, wherein the lower surface 565 faces the wind propagating in a wind direction 567. A so-called chord line 569 is definable representing the straight line connecting the leading and trailing edges of the blade airfoil. The chord line 569 lies in a plane 571. An angle β between the rotation plane 561 and the chord plane 571 defines the blade pitch angle of the rotor blade 541. When the chord plane 571 coincides with the plane of rotation 561 the blade pitch angle is zero degree, when the chord plane 571 rotates clockwise, the blade pitch angle increases from zero to positive values. In particular, increasing pitch angle results in pitching towards feather, while decreasing pitch angle results in pitching towards stall.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for determining pitch angle adjustment signals for adjusting a pitch angle of a rotor blade connected to a rotation shaft of a wind turbine, the method comprising:
   first, obtaining a power signal expressing power output of the wind turbine;
   second, obtaining a first maximal speed signal indicative of a first desired maximal rotational speed of the rotation shaft for a first operational mode;
   third, deriving a first pitch angle adjustment signal based on the first maximal speed signal and the power signal;
   fourth, obtaining a second maximal speed signal indicative of a second desired maximal rotational speed of the rotation shaft different from the first desired maximal rotational speed of the rotation shaft for a second operational mode; and
   fifth, deriving a second pitch angle adjustment signal based on the second maximal speed signal and the power signal, wherein the second pitch angle adjustment signal is different from the first pitch angle adjustment signal;
   sixth, adjusting the pitch angle of the rotor blade to a first pitch angle based on the first pitch angle adjustment signal; and
   seventh, adjusting the pitch angle of the rotor blade to a second pitch angle based on the second pitch angle adjustment signal.

2. The method according to claim 1, wherein the power signal expresses that the power output of the wind turbine is smaller than a nominal power output of the turbine.

3. The method according to claim 1, wherein the second desired maximal rotational speed of the rotation shaft is smaller than the first desired maximal rotational speed of the rotation shaft.

4. The method according to claim 1, wherein, when the second desired maximal rotational speed is desired as the rotational speed of the rotation shaft, the adjusting the of pitch angle to the second pitch angle results in a higher power output of the wind turbine than adjusting the pitch angle to the first pitch angle.

5. The method according to claim 1, wherein the first pitch angle and/or the second pitch angle increases or decreases or is constant for increasing power output of the wind turbine and/or for increasing wind speed.

6. The method according to claim 1, wherein the second desired maximal rotational speed is smaller than the first desired maximal rotational speed, wherein the second pitch angle is greater than the first pitch angle.

7. The method according to claim 6, wherein, for a given power output and/or wind speed, the second pitch angle is all the more greater than the first pitch angle the smaller the second desired maximal rotational speed is compared to the first desired maximal rotational speed.

8. The method according to claim 6, wherein the second pitch angle increases more strongly for increasing power output and/or increasing wind speed than the first pitch angle.

9. The method according to claim 1, wherein the second desired maximal rotational speed is between 50% and 90% of the first desired maximal rotational speed.

10. The method according to claim 1, wherein the first pitch angle and/or the second pitch angle is constant for power output below a threshold.

11. The method according to claim 1, wherein the first pitch angle is constant for a rotational speed below the first desired maximal rotational speed and/or wherein the second pitch angle is constant for a rotational speed below the second desired maximal rotational speed.

12. The method according to claim 1, wherein, when the second desired maximal rotational speed is desired as the rotational speed of the rotation shaft, the adjusting the pitch angle to the second pitch angle results in a higher power output of the wind turbine than adjusting the pitch angle to the first pitch angle.

* * * * *